Jan. 24, 1956 J. J. WOODBURN 2,731,962
OVEN VENT
Filed Nov. 28, 1952
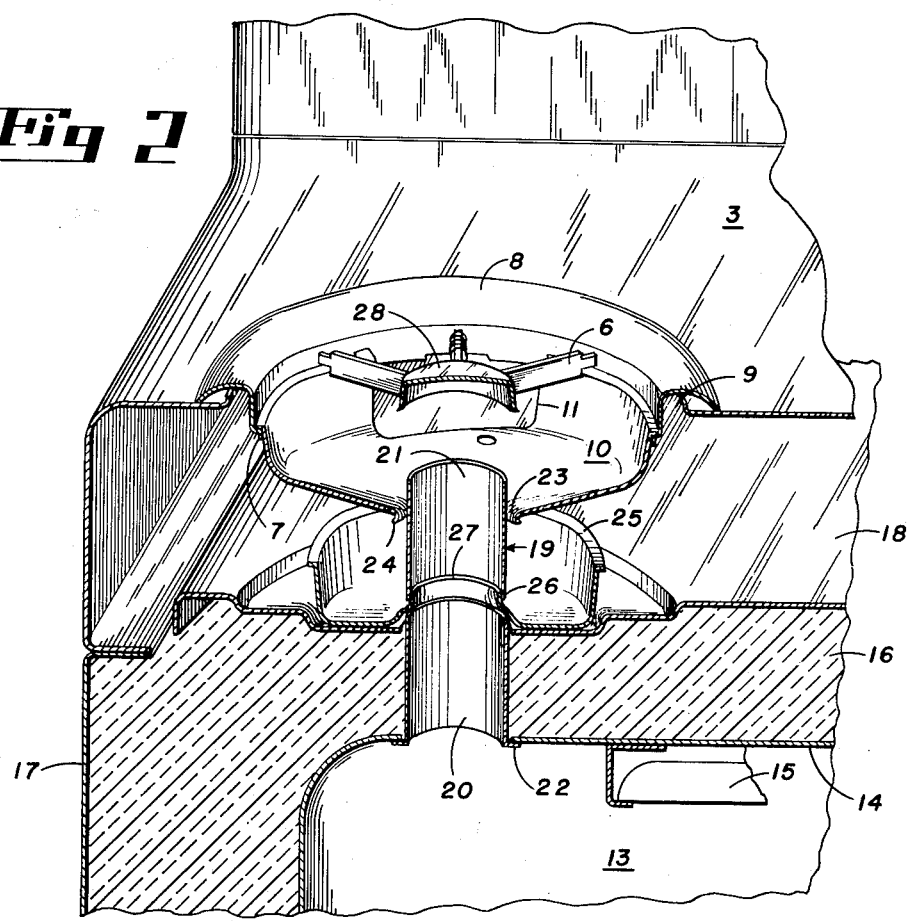
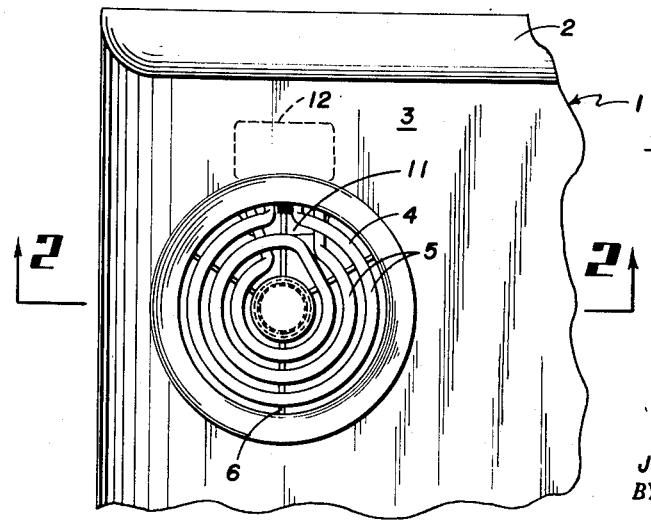
INVENTOR.
JOSEPH J. WOODBURN.
BY Alden D. Redfield
Warren Kunz.
ATTORNEYS.

United States Patent Office 2,731,962
Patented Jan. 24, 1956

2,731,962
OVEN VENT

Joseph J. Woodburn, Cincinnati, Ohio, assignor to Avco Manufacturing Corporation, Cincinnati, Ohio, a corporation of Delaware Application November 28, 1952, Serial No. 322,844

3 Claims. (Cl. 126—21)

The present invention relates broadly to ranges and, more particularly, to an oven vent for a domestic range. The invention finds particular utility in an electric range although it is not limited to such use.

More specifically, the present invention concerns a vent for the vapors and fumes generated in the oven of a domestic range while it is in use. Briefly stated, the present invention comprises a cylindrical vent pipe vertically and centrally positioned beneath a surface burner of the range. The vent pipe is made in two sections, the lower section being secured to the body of the range, the upper section being removable to facilitate cleaning. Attached to the upper section is an annular drip pan which, during use, is positioned centrally beneath a reflector shield which, in a conventional manner, is suspended directly beneath the surface burner. The upper section of the vent pipe projects slightly above the reflector shield and is spaced slightly therefrom so that any condensate from the oven vapors, and any materials spilled through the surface burner, drain readily to the annular drip pan. The upper section of the vent pipe and annular pan can be readily removed for cleaning simply by raising the heating element and removing the reflector shield.

The present invention is characterized by simplicity of design and economy of construction. At the same time, the vertical position of the vent pipe assures effective oven venting and makes it easy for the user to maintain the vent and all associated parts in a clean, sanitary condition.

In view of the foregoing, it is obviously an object of the present invention to provide a new and improved oven vent for a range.

More particularly, it is an object of the invention to provide an oven vent made in sections to facilitate installation and removal.

A further object is the provision of an oven vent including a vertical vent pipe, free from elbows and obstructions, whereby efficient venting is attained through the use of a relatively small diameter vent pipe.

An important advantage and object of the present invention is the provision of a vent pipe section to which is integrally secured an annular drip pan, the combined section and pan being easily removed through a surface burner opening for cleaning purposes. An associated object is the provision of an oven vent in which a drip pan and a section of the vent are combined for simplicity and economy of production.

The novel features that are considered characteristic of my invention are set forth in the appended claims; the invention itself, however, both as to its construction and use, together with additional objects and advantages thereof, will best be understood from the following description of a specific embodiment when read in conjunction with the accompanying drawings, in which:

Figure 1 is a fragmentary top plan view of the left rear corner of a domestic range showing a conventional surface burner positioned centrally above the improved vent; and Figure 2 is a cross sectional view, in perspective, taken on plane 2—2 of Figure 1, showing the vent installation. In this view, the heating element of the surface burner has been removed to simplify the illustration.

The present invention finds particular use in a range, generally designated 1, having a rear background 2 and a top horizontal work surface 3 in which is positioned a surface burner, indicated at 4. The surface burner, as shown in Figure 1, is an electrical resistance unit having concentric tubular heating elements 5 which rest on a three legged spider 6 supported by an inturned flange 7 of an annular trim frame 8.

The trim frame is centrally disposed within an opening 9 formed in the top of the range 3. Resting on flange 7 is a conventional reflector shield 10 which aids in reflecting the radiant heat from elements 5 against the bottom of a utensil (not shown) placed on the surface burner for heating purposes. Shield 10 defines an opening 11 through which the end portions of the heating elements extend to a terminal block 12 (see Figure 1).

As shown in Figure 2, the range includes an oven 13 defined in part by an inner liner 14. A heating element, indicated at 15, may be used for baking and/or broiling operations, as may be required. The liner 14 is surrounded by thermal insulation 16 which is confined between the outer shell 17 of the range and an insulation retainer 18.

As will be appreciated by those skilled in the art, it is necessary to provide a vent for the oven to carry off fumes and vapors generated within the oven by baking operations. It is well-known that such vapors can be advantageously vented through a surface burner, for, if the burner is in use, the heat of the heating elements tends to consume the vapors and render them innocuous. Further, it is convenient to vent the oven through a surface burner since it avoids the necessity of a separate vent opening formed in the top of the range.

As indicated in Figure 2, the vent taught by the present invention comprises a vertical vent pipe, generally designated 19. The vent pipe is made in two sections, a lower section 20 and an upper section 21. The lower section is flanged at 22 and is removably secured to the oven liner 14. This lower section of the vent pipe extends through insulation 16 and the insulation retainer 18, and carries the vapors from the oven to the lower end of vent section 21.

Vent section 21 in turn passes through an opening 23 formed centrally in the lower portion of the reflector shield 10. Opening 23 may be defined by a lip 24.

An important feature of the present invention is the provision of an annular drip pan 25 which is secured at 26 to the lower end of vent section 21. As will be apparent from Figure 2, the drip pan is provided with a central upwardly extending annular projection 27 which is closely fitted within the lower end of vent section 21.

It is to be noted that the vent pipe 19 is centrally positioned beneath a medallion 28 which is secured to spider 6. Provision of such a medallion is conventional in electric ranges, but is taken advantage of in the present invention to form a protective member above the end of the vent pipe to prevent spillage into the vent. Thus, any liquids, or other materials, spilled into the surface burner are deflected by medallion 28 into the reflector shield, from which the materials pass through opening 23 to the annular drip pan 25. It will be noted that clearance is provided between opening 23 and the vent pipe to permit the passage of such materials.

When the oven is in use, vapors pass freely up through the vent pipe sections and impinge against the medallion 28. These vapors may then pass through the surface burner into the room. A certain portion of the vapors, deflected by the medallion 28 against the reflector shield, may condense thereon and drain down to the drip pan.

It will be appreciated that the drip pan and vent pipe should be cleaned periodically. The preferred embodiment may be easily cleaned simply by removal of the surface burner and reflector shield in a conventional manner, thereby permitting withdrawal of the combined drip pan and upper vent section through the trim frame 8. The drip pan and vent section may then be thoroughly and easily washed and the lower vent section 20 may be readily cleaned with a cleaning rag, or by any other suitable means. When the components of the installation have been cleaned, they may be easily restored to their positions of operation, and the surface burner and oven vent installation may again be used in a normal manner.

It is to be noted that the present invention provides a straight vertical vent pipe which improves venting efficiency and makes possible the use of a smaller vent than conventionally provided in a range. Furthermore, it will be noted that the vent is constructed in such a manner that complicated stampings, elbows, catch basins, and comparable elements are avoided. At the same time, there is no sacrifice in efficiency or facility of use, and a drip pan is provided having ample capacity for normal spillage.

It is also to be noted that the vent can be used with conventional surface burners and does not require any modification thereof. Although the present invention has been described with particular reference to an electric range, it is obvious that it can also be used to advantage in a gas range.

Having described a preferred embodiment of my invention, I claim:

1. In combination in a range, an oven within the range, a work surface located above said oven, said work surface defining a surface burner opening directly above said oven, a surface burner disposed within the surface burner opening, an apertured reflector shield disposed closely beneath said surface burner, said surface burner including a heating means and a medallion centrally disposed above the aperture of said reflector shield, an oven vent comprising a vent pipe including a lower section and a removable upper section, said lower section being in communication with said oven and being disposed vertically below and in alignment with said medallion, an annular drip pan, said pan being integrally secured to and surrounding said upper section of said vent pipe, said upper section being disposed in vertical alignment with said lower section, said medallion being disposed in covering relationship above the upper end of said upper section, said upper section projecting with clearance through the aperture of said reflector shield to a point directly beneath said medallion, whereby vapors from said oven may pass through said vent to the region of said surface burner, said medallion preventing spillage from entering said vent, such spillage being directed by said medallion to said reflector shield by which it is directed to the exterior of said upper section and to said drip pan.

2. In combination in an electric range, an oven, thermal insulation surrounding said oven, an insulation retainer confining said insulation directly above said oven, a vent pipe including a lower section extending vertically from said oven through said insulation and said insulation retainer, an upper section of said vent pipe removably disposed in vertical alignment with said lower section, an annular drip pan resting upon said insulation retainer and integrally secured to and surrounding the lower end of said upper section of said vent pipe, a surface burner including a tubular heating element and a centrally positioned medallion surrounded by said heating element, said medallion being vertically aligned with and in covering relationship above said vent pipe, an apertured reflector shield beneath said heating element, the aperture of said reflector shield being in vertical alignment with said medallion and surrounding said upper vent pipe section with clearance, said upper vent pipe section and said annular drip pan being removable as a unit for cleaning purposes.

3. In combination in a range, an oven, a work surface directly above said oven, a heating element, said heating element being supported by said work surface, an apertured reflector shield beneath said heating element, a centrally disposed medallion surrounded by said heating element and located vertically above the aperture of said reflector shield, a vent pipe extending from said oven vertically through the aperture of said reflector shield with clearance between said pipe and said reflector shield, said medallion being disposed in covering relationship above said vent pipe, and a drip pan surrounding said vent pipe whereby vapors from said oven are delivered to a point directly below said medallion and spillage is directed by said medallion and said reflector shield around the exterior of said vent pipe to said drip pan.

References Cited in the file of this patent

UNITED STATES PATENTS

| 2,337,349 | Rees | Dec. 21, 1943 |
| 2,375,047 | Sutherland | May 1, 1945 |
| 2,384,262 | Rutan | Sept. 4, 1945 |
| 2,569,652 | Berg | Oct. 2, 1951 |

FOREIGN PATENTS

| 118,826 | Switzerland | May 20, 1947 |